(12) United States Patent (10) Patent No.: US 7,979,296 B2
Kruse et al. (45) Date of Patent: Jul. 12, 2011

(54) UNIVERSAL WORKLIST SERVICE AND USER INTERFACE

(75) Inventors: Matthias Kruse, San Francisco, CA (US); Nicolai Jordt, Angelbachtal (DE); Dirk Wodtke, Aptos, CA (US)

(73) Assignee: SAP AG, Walldorf (DE)

( * ) Notice: Subject to any disclaimer, the term of this patent is extended or adjusted under 35 U.S.C. 154(b) by 1466 days.

(21) Appl. No.: 10/841,241

(22) Filed: May 7, 2004

(65) Prior Publication Data

US 2005/0033626 A1 Feb. 10, 2005

Related U.S. Application Data

(60) Provisional application No. 60/478,514, filed on Jun. 13, 2003.

(51) Int. Cl.
*G06Q 10/00* (2006.01)
(52) U.S. Cl. ...................................................... 705/7.26
(58) Field of Classification Search .................. 705/7.26
See application file for complete search history.

(56) References Cited

U.S. PATENT DOCUMENTS

| | | | |
|---|---|---|---|
| 5,077,666 A | 12/1991 | Brimm et al. | |
| 6,117,079 A | 9/2000 | Brackett et al. | |
| 6,287,257 B1 | 9/2001 | Matichuk | |
| 6,957,186 B1 * | 10/2005 | Guheen et al. | 705/1 |
| 7,222,334 B2 * | 5/2007 | Casati et al. | 717/136 |
| 7,403,948 B2 * | 7/2008 | Ghoneimy et al. | 707/10 |
| 2004/0068424 A1 * | 4/2004 | Lee et al. | 705/7 |
| 2004/0068728 A1 * | 4/2004 | Blevins | 718/100 |
| 2006/0059253 A1 * | 3/2006 | Goodman et al. | 709/223 |

OTHER PUBLICATIONS

Computer Architecture Tutorial downloaded on Apr. 22, 2009 from url: http://www.cs.iastate.edu/~prabhu/Tutorial/CACHE/mem_title.html.*
Internet Wayback Machine search of http://www.cs.iastate.edu/~prabhu/Tutorial/CACHE/mem_title.html download on Apr. 22, 2009.*
Dahalin, Zulkhairi M. et al.; "Workflow Interoperability Using Extensible Markup Language (XML)"; 2002 Student Conference on Research and Development Proceedings, Shah Alam, Malaysia, pp. 513-515.

* cited by examiner

*Primary Examiner* — Romain Jeanty
*Assistant Examiner* — Mark A Fleischer
(74) *Attorney, Agent, or Firm* — Fountainhead Law Group PC (57) ABSTRACT

Work items are collected from one or more work item providers for presentation to a workflow participant. A work item provider is typically a workflow management system ("WFMS"), but other providers of work items might exist that generate work items and may or may not have their own local worklist. Multiple independent WFMS's of multiple types might provide work items to a universal worklist ("UWL") service that integrates the work items from all of the providers. Additional integration might be provided between the UWL and work item providers, such as for controlling work item execution with a sub-workflow through an ad-hoc workflow engine. Additional integration provides for custom attributes. Each work item has a type that is used to determine handling for that work item. A universal work list service includes storage for work items, wherein a work item represents a task generated as part of a process flow. An engine supporting the UWL service might track item types for work items and might obtain attribute values for attributes of the work item according to the work item's type.

20 Claims, 6 Drawing Sheets

WORK ITEM

| STANDARD ATTRIBUTES | DESCRIPTION |
| | PRIORITY |
| | STATUS |
| | DUE DATA |
| | . . . |
| CUSTOM ATTRIBUTES | |
| | |
| | |
| | |
| | . . . |
| ITEM TYPE | |
| ATTACHMENTS | |
| ITEM ID | |
| SOURCE ID | |
| . . . | |

FIG. 4

| Universal Worklist | | | | | | |
|---|---|---|---|---|---|---|
| Work / Track / Start | All Items | | | | | Personalize View |
| Bill Smith | Subject | Created | Creator | Prio | Status | |
| ▫ My Home | ☐ Approve Vacation | Dec 1, 2002 | Tom Atkins | 4 | In Process | Similar Detail |
|   ▫ Overdue Items | ☐ Order to Production | Dec 1, 2002 | Fred Google | 3 | Prepared | Similar Detail |
|   ▫ Grouped by Type | ☐ Approve Vacation | Dec 1, 2002 | Laura Penn | 4 | In Process | Similar Detail |
|   ▫ Approvals | ☒ Approve Document Publish | Nov 25, 2002 | Fred Google | 2 | Ready | Similar Detail |
| ▫ Notifications | ☐ Scrap Cost Estimate | Dec 3, 2002 | Tom Atkins | 5 | In Process | Similar Detail |
|   ▫ Deadline Messages | ☐ Scrap Cost Estimate | Nov 14, 2002 | Frank Smith | 1 | In Process | Similar |
| ▫ Knowledge Mngmt | ☐ Customer Request for info... | Dec 6, 2002 | Mark Hughes | 5 | In Process | Similar Detail |
|   ▫ Subscribed Objects | ☐ Approve Vacation | Dec 1, 2002 | Tom Atkins | 4 | In Process | Similar |
|   ▫ Subscriptions | ☐ Approve Vacation | Dec 2, 2002 | Tom Atkins | 4 | In Process | Similar |
|   ▫ Docs to be approved | ☐ Approve Vacation | Dec 1, 2002 | Tom Atkins | 4 | In Process | Similar |
|   ▫ (Approved Docs) | | | | | | |
|   ▫ (Rejected Docs) | | | | | | |
|   ▫ Feedback | | | | | | |
| ▫ Last Viewed | | | | | | |
| ▫ Search ... | 1-10 21-30 31-36 ≥ ≥≥ / 36 | | | | | |
| | Forward  Reject  Delete  Copy | | | | | |

UNIVERSAL WORKLIST SERVICE AND USER INTERFACE

CROSS-REFERENCES TO RELATED APPLICATIONS

This application claims priority from U.S. Provisional Patent Application No. 60/478,514 entitled "Universal Worklist Service and User Interface" filed Jun. 13, 2003 which is incorporated by reference herein for all purposes.

FIELD OF THE INVENTION

The present invention relates generally to workflow management systems and in particular to workflow management systems and worklist presentation interfaces.

BACKGROUND OF THE INVENTION

In increasingly complex business operations, a business process might be formalized and facilitated using a workflow management system (WFMS). A WFMS typically includes a workflow engine that generates work items according to activities defined as workflows supporting one or more business processes. As an example, an organization might have a set process for approval for particular activity and the WFMS handles routing a corresponding work item among those individuals that need to sign off on the approval. For example, an employee desiring a vacation might initiate a "vacation approval" business object. A vacation application would then send an event to the WFMS, along with a reference to the business object (vacation request) and the WFMS would pick and start a workflow that corresponds to the triggering event. The vacation approval request would be routed among those others that would need to track, approve or just be notified of such a request, with a result of the work (e.g., approval, denial, etc.) routed back to the initiating employee. As another example, a product design process might involve a designer who designs the product, a product manager that reviews design documents from the designer, a marketing reviewer that approves, edits, etc. marketing details, each of whom has a work item related to the development. While some work items require human interaction, notice and/or decision-making, other work items might able to be automatically handled by the WFMS.

The work items needing a particular person's (or role's) input or notice might be presented to that person or role as an item on a worklist. In some cases, work items can be acted on directly from a presentation of a worklist, while others are acted on by the workflow participant taking an action outside the worklist. In addition, participants may have other tasks and collaborative events.

Some interactions might use the WFMS in part and use unrelated applications in part. For example, a work item might be generated for handling by a user that prompts the user to make a decision that requires information not present in the work item. For example, the work item might specify that employee A wants to take N days of vacation from date D1 to date D2 and request an approval/rejection response from the participant to whom the work item is assigned. That participant might then have to obtain further information externally, such as by conferring with A's group manager and relevant project managers, as well as checking with a human resources department or human resources application to determine if A has sufficient vacation time available.

Enterprise portals integrate heterogeneous applications, content and systems across extended enterprises, but generally portal integration combines application or system user interfaces. Existing workflow management systems have disadvantages that might be overcome by an improved workflow management system.

BRIEF SUMMARY OF THE INVENTION

In one embodiment of a system according to the present invention, work items are collected from one or more work item providers for presentation to a workflow participant. A work item provider is typically a workflow management system ("WFMS"), but other providers of work items might exist that generate work items and may or may not have their own local worklist. Multiple independent WFMS's of multiple types might provide work items to a universal worklist ("UWL") service that integrates the work items from all of the providers. Additional integration might be provided between the UWL and work item providers, such as for controlling work item execution with a sub-workflow through an ad-hoc workflow engine. Additional integration provides for custom attributes. Each work item has a type that is used to determine handling for that work item.

In some embodiments, a universal work list service is provided, including storage for work items, wherein a work item represents a task generated as part of a process flow. An engine supporting the UWL service might track work item types for work items and might obtain attribute values for attributes of the work item according to the work item's type.

A further understanding of the nature and the advantages of the inventions disclosed herein may be realized by reference to the remaining portions of the specification and the attached drawings.

DETAILED DESCRIPTION OF THE INVENTION

Workflow represents automation of business processes, in whole or part, during which documents, information and/or tasks (work items) are passed from one workflow participant to another. A human workflow participant typically interacts with a workflow management system through an interface that provides the participant with a view of a list of work items assigned to that participant either directly or to a role that the participant is playing. Work items can be assigned to individuals, sets of individuals or to roles that are resolved to individuals upon execution of the work item.

A work item is a representation of work to be processed or a task to be done. A workflow management system might track various business processes for an application, presenting work items to participants and collecting results from the participants. A work item might never be executed, as a business process represented by a workflow might have a control flow such that the work item is not needed. For example, suppose an engineering design workflow for a product involves review by A, then B, then C, but not if D invokes a product cancellation process. A work item "review by A" might be created and presented to A. If A reviews the document and returns "accept document", then a work item for B would be generated. If D cancels the product before B completes the review, a work item for C to review the design will never be executed.

In embodiments of a universal worklist ("UWL") service according to the present invention, work items are collected from one or more work item providers and presented to a participant, as is explained further below. A work item provider is typically a WFMS, but it is possible to have other systems providing work items to the UWL.

Figure 1:
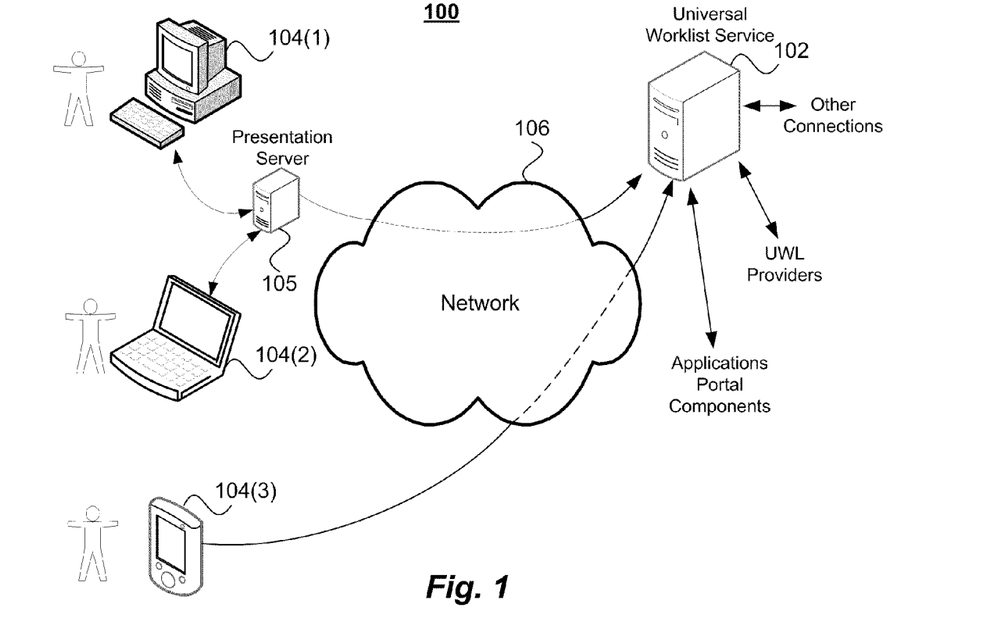
FIG. 1 illustrates an environment in which the present invention might be used.

FIG. 1 illustrates one environment 100 wherein a UWL service might be used. In that example, a UWL service 102 supports a plurality of users that act as participants in business processes via participant client systems 104. In this example, client systems 104 are coupled to a computer system operating UWL service 102 via a network 106, but other configurations are possible and the particular configuration of hardware is not an essential limitation of the present invention.

As shown, various client systems 104 might be used, such as a desktop 104(1), a laptop 104(2) and a handheld wireless device 104(3). Some clients might be coupled via a presentation server 105.

Figure 2:
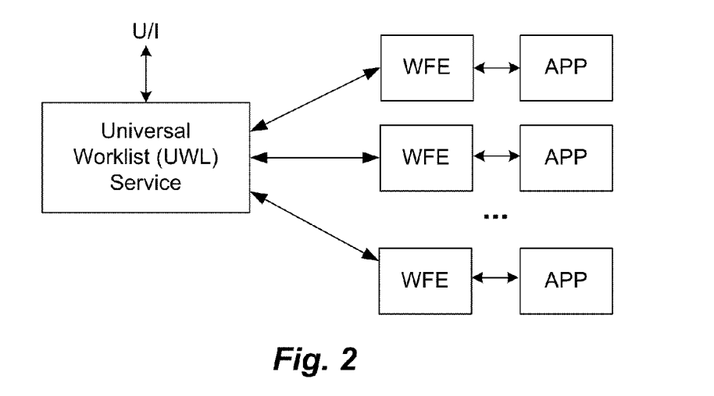
FIG. 2 illustrates one arrangement of a universal worklist service.

As illustrated in FIG. 2, the UWL service couples to one or more workflow management systems that are associated with applications, where a workflow management system typically is associated with one or more application to obtain work items.

Figure 3:
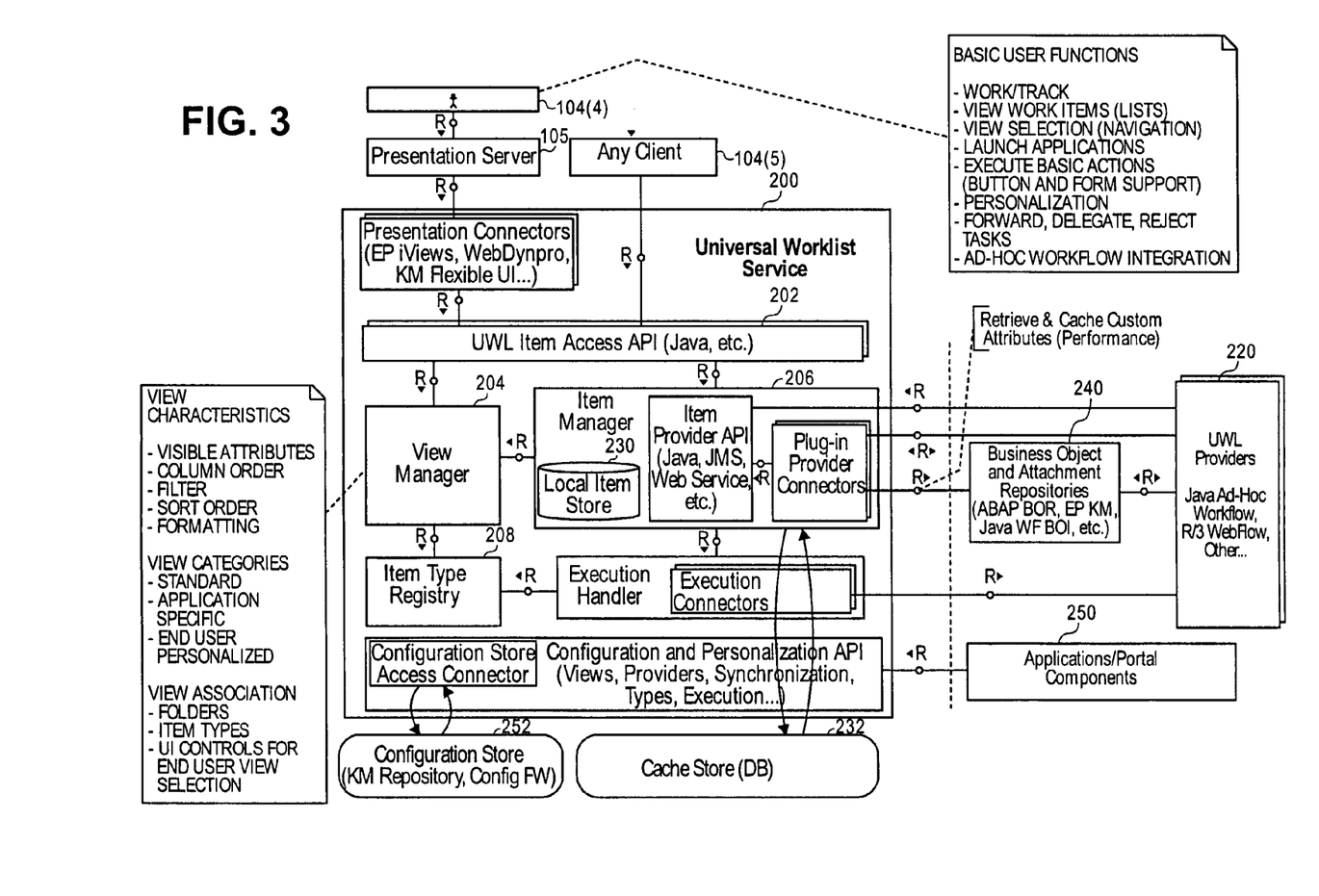
FIG. 3 is a block diagram showing a universal worklist service in greater detail.

FIG. 3 illustrates one example of a UWL service 200 in greater detail. As shown there, clients such as 104(4) and 104(5) interact with UWL service 200 to perform various functions. Those functions include performing work items, tracking work items, viewing lists of work items, navigating lists, launching applications, executing basic actions, completing the work items, etc. As illustrated, client 104(4) requests information about work items from presentation server 105, which in turn makes requests of a presentation connector corresponding to presentation server 105, while other clients, such as client 104 (5) makes requests directly of a UWL item access application programming interface ("API") 202, that might be a Java™ API, or other form of API.

API 202 in turn makes requests of a view manager 204 and an item manager 206. View manager 204 handles view characteristics, view categories and view associations. In various places in FIG. 3, "R" arrowheads indicate the typical direction for a request. Thus, API 202 makes requests of view manager 204, which in turn makes requests of an item type registry 208.

Item manager 206 obtains work items from work list providers 220. In some embodiments, item manager 206 can pull work items from work list providers as well as having work list providers push work items to item manager 206. Item manager 206 might store work items in local item store 230 but might also rely on a cache store 232 and obtaining work list items in real-time as needed. As shown, work item manager 206 includes plug-in provider connectors that connect to work list providers and/or business object and attachment repositories 240. A configuration and personalization API might be provided for connections with applications and/or portal components 250.

The UWL service collects work items from one or more applications or workflow engines that might be located in different systems and support disparate legacy applications. Work item providers can push items into the UWL through a well-defined and open UWL API. The UWL service is also able to pull or retrieve work items from a provider. The connectors used for obtaining the work items can be, for example, SAP™ WebFlow™ connectors. An open connector framework allows implementation of other connectors as needed. Connectors might provide attachment integration with knowledge management systems and SAP's R/3 Office function modules ("FMs") as providers of attachments.

The UWL service can be integrated with an ad hoc workflow system, such as the embodiments described in U.S. Provisional Patent Application 60/469,051 filed May 7, 2003, entitled, "AN END USER ORIENTED WORKFLOW APPROACH INCLUDING STRUCTURED PROCESSING OF AD HOC WORKFLOWS WITH A COLLABORATIVE PROCESS ENGINE". Execution of work items from the UWL can be controlled by workflows. For example, the arrival of some work items might trigger workflows to process these work items, which may lead to the generation of other work items.

The UWL service can reference data from a variety of applications. In some embodiments, the integration is such that work processes can span workflow engines, allowing work processes implemented in one workflow engine to be linked with processes running on another workflow engine so that users can define processes comprising a series of steps and then execute the original work item after those steps.

Work items might have associated attributes, such as description, due date, etc., as a work items maintained by their respective provider, and custom attributes might be added to work items by UWL service 200 for enhanced functionality. Attributes can take several forms, such as name=value pairs, column name and value, etc. In the examples here, attributes are described as being name=value pairs. For example, a work item might have an attribute of "description=WorkItem 1234".

Preferably, each work item handled by UWL service 200 as an attribute for item type and that item type is registered in item type registry 208. Each item type might have different parameters for handling work items of that type. For example, receipt of work items of a particular item type might trigger an action to obtain additional custom attribute values for the work items.

When a participant is presented with a work item, the presentation should preferably include all the information required by that participant to perform his or her work on that work item with full knowledge, so that the participant would not normally need to switch among the various applications and/or systems to determine what actions are needed or to obtain information in order to respond to an action request. In order to accommodate this need, the UWL service 200 might supplement the standard work item attributes included with the work item when received with custom attributes. With relevant and needed attributes being available to the UWL service and presented to the participant in a UWL presentation, the participant can deal with each work item without having to search for additional information elsewhere.

The custom attributes can be retrieved from various sources. For example custom attributes might be retrieved using supported business object models such as from an ABAP BOR (Business Object Repository) system, from SAP's KM Repository Framework, from workflow context of the work item, from XML attachments via XPath expressions, from Java™ Workflow BOI, from web service calls, etc. In the general case, custom attributes can be obtained via attribute connectors. Workflow items might obtain their custom attributes from a Java workflow context or WebFlow contexts. One provider of work items into the UWL is SAP's ad-hoc workflow engine.

These custom attributes can be retrieved for the work item without any support from the original work item provider. As an example, consider a work item of type=vacation-approval, wherein the work to be done is to approve or reject a vacation request. This is a typical work item presented to a manager. The work item might include some standard attributes, such as a priority, a description and a due date for the manager to take action on the work item. A custom attribute might be added by the UWL service to enhance the process. For example, item manager 206 might automatically make queries to an external human resources system to identify the number of a vacation days accrued by the requesting employee and the number vacation days requested, so that information could be included as a custom attribute for the work item when presented to the manager.

Work items can be pulled from various providers as a participant logs into a participant client system coupled to UWL service 200. This might be done in a parallel if work items need to be obtained from various providers. The pulling process can also be performed at scheduled intervals. The pull strategy can use connectors and allows for support of legacy or third party systems. Pull connectors might operate online, in real-time, be controlled by a scheduler or be event triggered.

If numerous pull provider systems are needed, separate retrieval of custom attributes might result in significant performance problems, such as a long delay for real-time attribute retrieval for all list items when a participant starts a worklist client. To overcome this delay, attributes, and possibly even work items themselves, might be cached for the participant. Caching introduces a potential for data being out of date, but this can be overcome by allowing the participant to initiate a refresh manually or use a staggered synchronization process. In a staggered synchronization process, different synchronization timing might be used for different item types and/or providers. For example, critical data can be updated in real-time, while data that is known not to change frequently can be updated less frequently.

In addition to obtaining work items and standard attributes, UWL service 200 obtains custom attributes for the obtained work items depending on the item types of those work items. The values for the custom attributes can be retrieved from various sources. If real-time retrieval of custom attributes is too burdensome, they can be obtained according to a schedule and/or cached in cache store 232.

Figure 4:
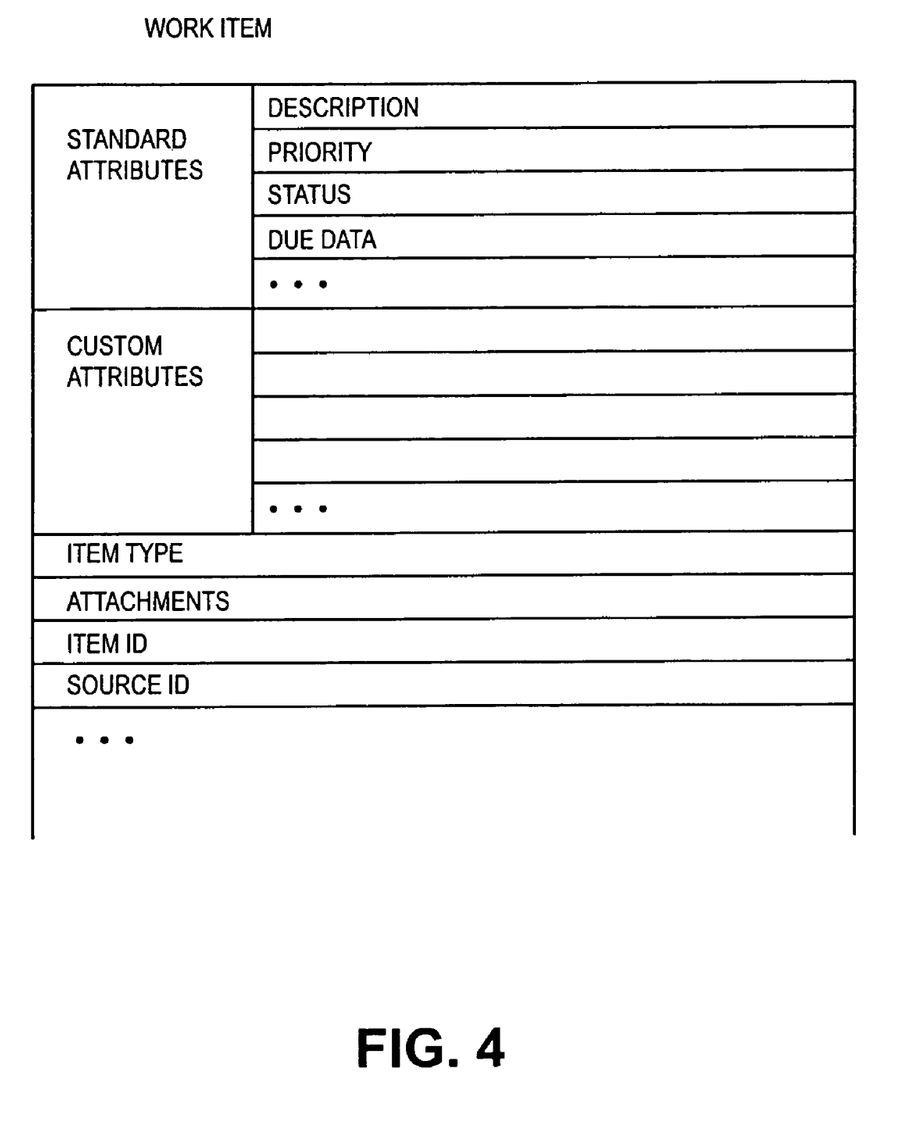
FIG. 4 is a schematic diagram one example of a data structure for a work item handled by a universal worklist service.

FIG. 4 illustrates one possible organization for work items. As shown there, a work item is represented as having one or more standard attributes provided by the work item's provider and zero or more custom attributes that can be obtained by UWL service 200 with the assistance of the work item provider or independent of the work item provider. Other elements of a work item as shown include an item type, zero or more attachments or pointers to attachments, an item identifier, a source identifier and possibly other elements.

Typically, custom attribute definitions are specific to work item types and are represented in item type registry 208. Continuing the example used above, item type registry 208 might indicate that for work items of type=vacation-approval, one custom attribute is vacation days accrued.

As work items are presented to a workflow participant, the participant can make decisions and/or take actions having sufficient information because of the custom attributes for the particular item types. Item types further allow the configuration of specific item execution. Participant decisions can be presented to the participant and a result obtained and recoded using a selection interface, a form interface, or other interface. With a selection interface, a selection of one option from a set of alternatives (e.g., "approve", "deny", "defer") is accepted. For a form interface, forms are presented to the participant by the UWL service and integrated into its user interface—applications do not need to provide their own specific user interfaces. For a list interface, a participant can directly take an action on one of the work items on the list by selecting links, using radio buttons, entering data in a form etc.

In addition to the default execution of items, items can get a set of actions assigned to them that can be performed. The UWL service might delegate action execution to the work item provider or a configured application.

Since work items are associated with work item types, they can not only get custom attributes assigned that are retrieved independently from the item provider, but also type-specific action handlers, type-specific list views, and type-specific ad hoc workflow rules and subprocess templates might be associated with a work item.

One advantage of a universal worklist is that actions can be taken over the entire worklist. For example, a free text search can search over all text attributes of work items, filtering as desired.

Type Hierarchies

Type hierarchies allow inheritance and specialization of these type characteristics. In some cases, work item types form a type hierarchy, such that a work item of an item type at a lower level of the type hierarchy inherits custom adage viewed definitions and possibly other elements from item types along the branches to higher levels of the type hierarchy.

Work item types might be organized such that they have a hierarchy, wherein child types inherit attributes from parent types. Types can be as fine or granular as required and might include inheritance of views, execution handling and rules. As an example, suppose an item type com.sap.uwl.workitem.approval.vacation is defined as an item type, which would be a child of com.sap.uwl.workitem.approval, a grandchild of com.sap.uwl.workitem, etc. Vacation approvals might have their own view, but might instead just inherit and reuse a view set up for com.sap.uwl.workitem.approval and not have a specific view set up for vacation approvals.

Determining a Work Item's Type

At runtime, a work item gets its type either assigned by the provider of the work item, a provider connector, or the UWL determines its type on based on type conditions. The type configuration system can be open and accessible through a well-defined API, allowing applications to register new types and provide tailored views.

EXAMPLES OF PRESENTATIONS

Figure 5A:
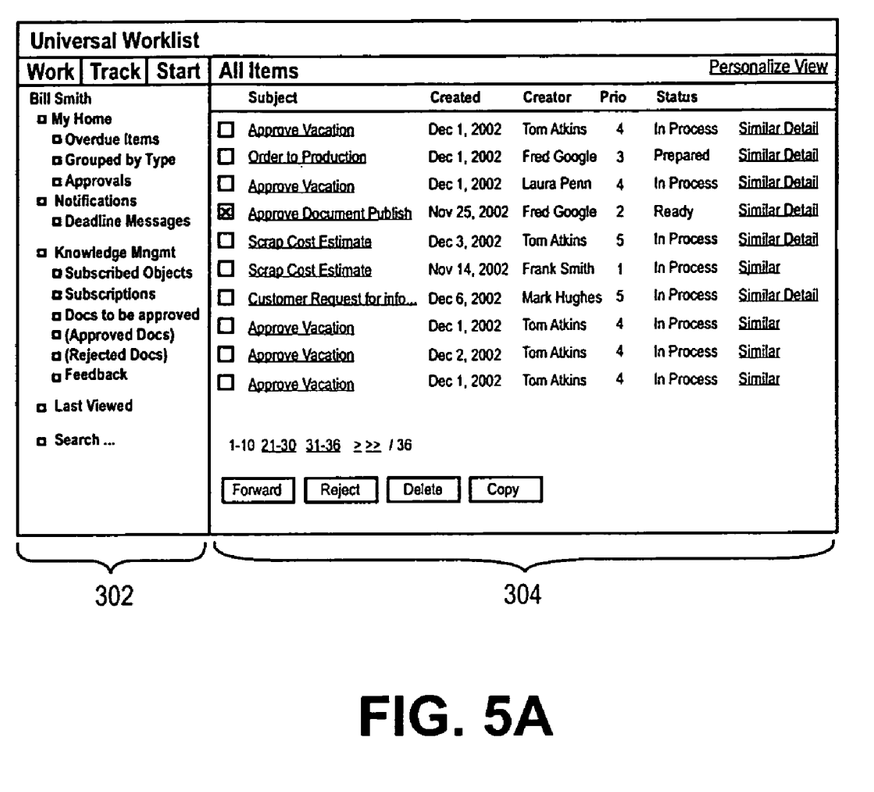
FIGS. 5(A)-(C) illustrate one presentation of a worklist.
Figure 5B:
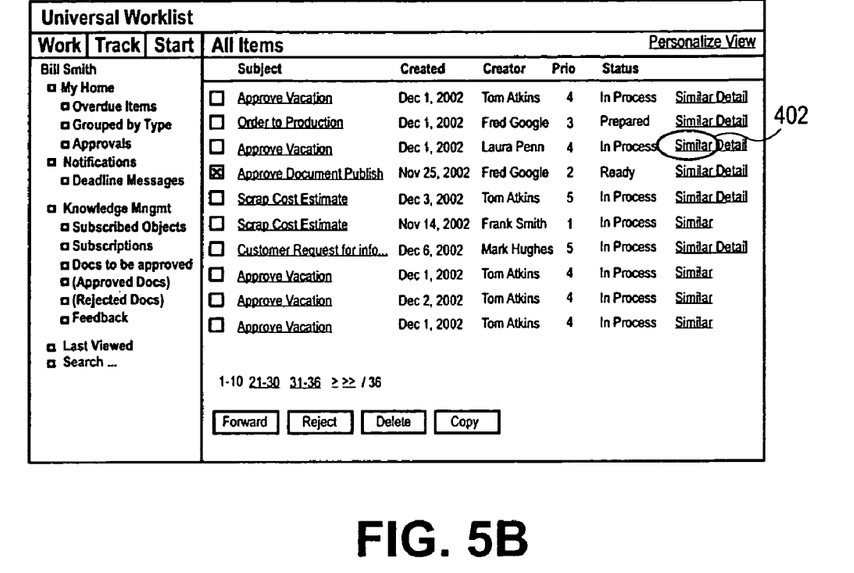
Figure 5C:
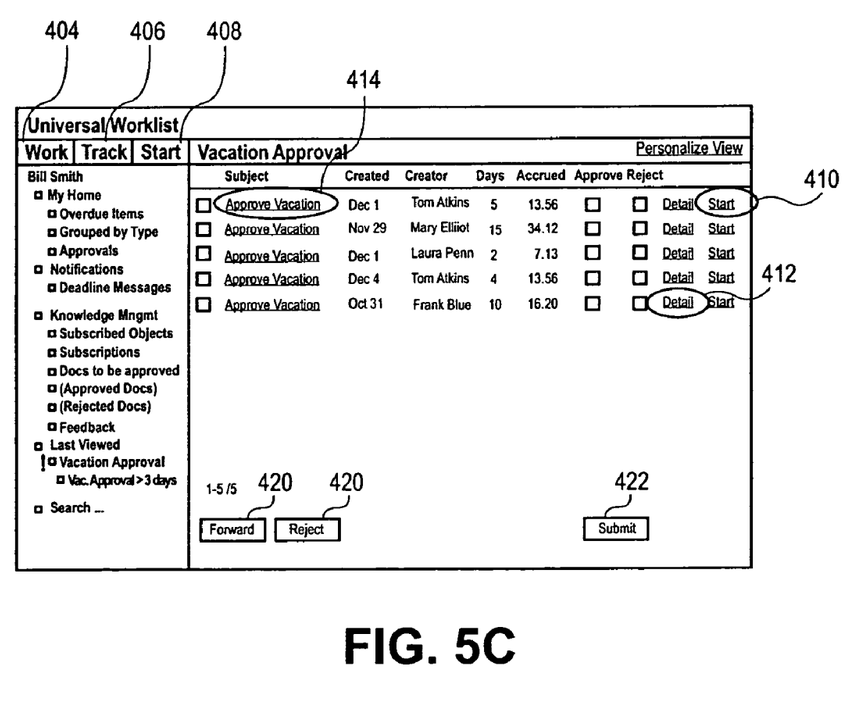

FIGS. 5(A)-(C) illustrate one presentation of a worklist as might be supported by UWL service 200. In the example of FIG. 5(A), work items are displayed according to a hierarchy in a navigation panel 302. A list panel 304 is also provided, wherein pending work items can be displayed. A view of items of one type can be selected by the user selecting the "similar" link 402 shown in FIG. 5(B), which would result in the view shown in FIG. 5(C). Note that the display in FIG. 5(C) provides additional attributes for the selected item type and a using those additional attributes, a participant can easily complete an action with the information at hand.

Note that navigation panel 302 includes tab controls, in this example being "work" 404, "track" 406 and "start" 408 tabs, with the "work" tab being selected. These tabs might allow the participant to perform some of the basic user functions shown in FIG. 3. As illustrated in FIG. 5(C), the user can select a link 410 to have a process for a work item executed, view more detail using a detail link 412 or take a default action using a work label blink 414. Additional options include the use of the "forward" and "reject" buttons 420. Multiple decisions can be submitted at once (batch decision), using the checkboxes and "submit" button 422.

A presentation of workflow items in a UWL service might support search filters and supporting operations such as forward, reject, execute, resubmit, etc. In particular embodiments, each work item has a type and a work item's type determines which attributes are presented with the work item. In some presentations, some attributes for a given type might be present but not displayed. In some user interfaces, users can select which attributes are shown and which attributes are not shown.

The UWL service might maintain one or more application scenarios defining particular views for particular work item types. A participant might be allowed to set up multiple views. Within a view, one or more work item types might be presented. In one embodiment, there might be exactly one view for given work item type with one or more work item types in each view, exactly one work item type for each view with some work item types possibly sharing a common view, or a distinct view for each distinct work item type. For a given view and a given work item type, the display parameters might include which attributes are visible and which are not, column position and width, sorting rules (attributes for sorting, priority order, ascending/descending), grouping (by selected attributes, etc.), filtering based on expressions using attributes to determine visible item and processes, layout actions and other parameters. A layout might indicate the number of visible lines, available action buttons and whether or not a preview pane is used.

A view might be presented as a portal component, with one or more list panel, one or more tree panel, and/or one or more preview area. A list panel lists work items. A tree panel displays all or part of work items in a hierarchical form where the work items fall into hierarchies. A preview area displays all or part of preview attributes for work items. In some embodiments, a user can create and save new views for some or all work item types, while in other embodiments the views are set by a system designer and/or administrator. In a portal system, portal components can register customized views and associate them with work item types.

For some views, the participant is provided with the ability to get more detail for a work item and/or start a process related to a work item's type. The detail view for a work item might include an enhanced description or notification message and list all of the custom attributes for the work item, or at least more attributes than are shown in the main view, along with participant decision options, where applicable.

A detail view might also be used to show attachments. To avoid long load times, the UWL service might cache just attachment references and attachment attributes rather than trying to gather all of the attachments for each work item on the worklist. Attachment attributes might include name, type, size, creator, creation date, etc. With such an arrangement, a participant's access to the attachment would require access to the provider of the attachment before it could be displayed, downloaded or uploaded for the participant.

The detail view might also display process history such as process definition, participants, status and results for work items. Integrating with a knowledge management system, the UWL service can also display a process discussion thread. Detail views can be personalized and customized for associated work item types.

Ad Hoc Workflow Engine Integration

Figure 6A:
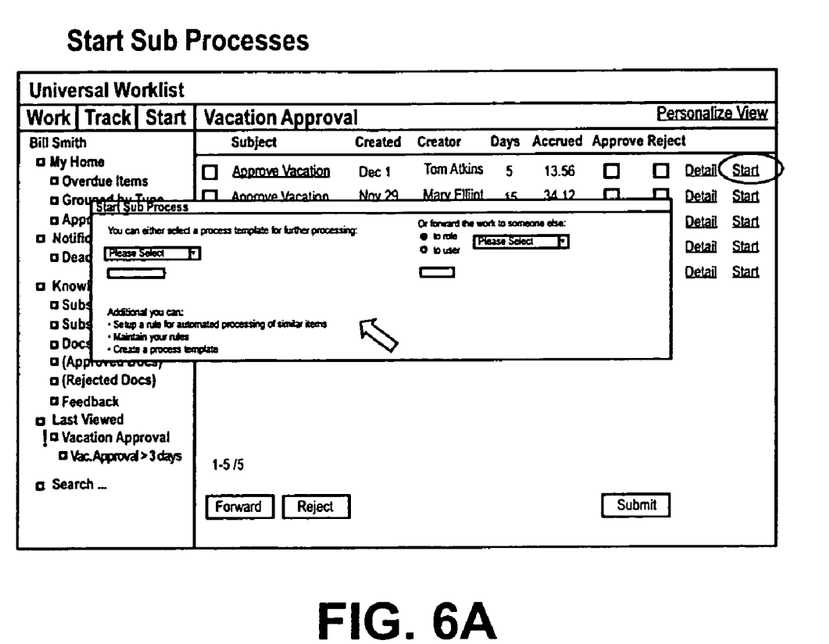
FIG. 6(A) illustrates starting a subprocess and FIG. 6(B) illustrates starting a subprocess using a custom rule.
Figure 6B:
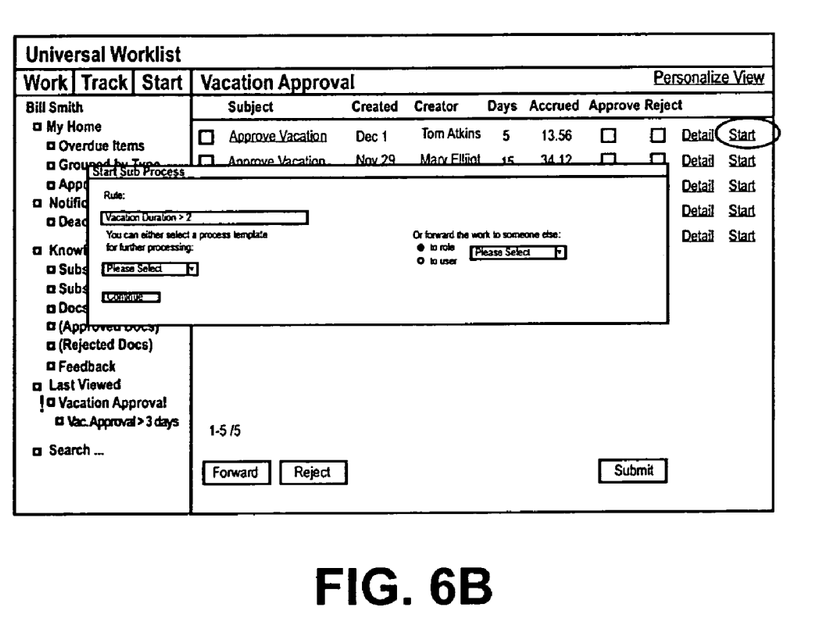

The UWL service can integrate tightly with an ad hoc workflow engine to allow users a maximum of flexibility and guided structure to organize and refine their work locally. Thus, a participant can indicate that a work item received by the UWL service for that participant is to be handled according to an ad hoc workflow. An example of this is illustrated in FIGS. 6(A)-(B). In that example, a participant handling vacation approval work items sets up an ad hoc workflow rule for handling work items of that type. In the example shown, the ad hoc workflow rule is to forward work items of type "vacation approval" to a specified role if the custom attribute Vacation.Duration<2. Participants can select, define or modify subprocesses for their work items in this manner. These subprocesses can be used to collect additional information through attachments, editable custom attributes or filling out forms.

In this manner, participants can define rules to launch subprocesses automatically and rules can be used to determine the result of user decisions automatically, based on the information provided in the work item attributes.

UWL as a Reusable Component

The UWL can be reused as component on application pages. The UWL can be made aware of its context such that it will only show items and views that are related to the application and its visual presentation can be configured to fit the user role in the application.

Integration of KM Tasks and Workflow Work Items

With a UWL, work items from work item providers (such as workflow engines) are presented to participants. In some embodiments, knowledge management ("KM") tasks are incorporated as work items in UWL presentations. One approach to making this integration simple is to expand the definition of workflow and integrate data models of KM tasks and work items.

Implementation Details

Implementation details of embodiments of a UWL service will now be described.

In more complex interactions, the participant might be presented with a simple form with input fields, check boxes, etc. The UWL service can create iView presentations dynamically. An open execution handler framework allows designers to configure additional handlers.

A UWL service has now been described that aggregates work items from multiple applications and workflow engines located in different systems and presents them in a common, central and unified list view to the users, using possibly different panels and/or type-specific views. Each work item can bring information and actions required for a workflow participant to perform the activity either directly within a UWL presentation or by launching the responsible application page. The UWL allows participants to retrieve information about the process context of their work items, and to track work processes they have initiated, were participating in, or they are subscribed to. The integration with workflow engines also offers them the possibility to select and start new processes from within the UWL.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A computer readable medium upon which are tangibly embodied computer program instructions that when executed by a computer cause the computer to perform a method comprising:

storing work items in a work item storage, wherein a work item is a task generated as part of a workflow process for handling by a user;

presenting work items via a graphical interface to the user from the work item storage and accepting input from the user relating to the work items;

accepting work items via an interface from a plurality of independent work item providers to be stored in the work item storage, wherein a work item provider comprises a workflow engine and one or more applications;

tracking, in an item type registry, handling for work items based on work item type; and retrieving, via a custom attribute retriever for a given work item of a given work item type and according to a staggered synchronization process, custom attributes for the given work item type that are in addition to attributes obtained with the given work item from its work item provider, wherein the custom attributes for the given work item are determined from the item type registry entry or entries for the given work item type, and wherein the custom attributes for the given work item are provided by a first legacy system and a second legacy system, wherein the staggered synchronization process operates during a start of a worklist client to reduce a delay of retrieving the custom attributes, and wherein the staggered synchronization process includes a first pull connector to the first legacy system having a first synchronization timing, and a second pull connector to the second legacy system having a second synchronization timing.

2. The computer readable medium of claim 1, wherein the interface for accepting work items further comprises a push interface configured to allow work items to be pushed from a workflow engine of at least one of the plurality of independent work item providers to the worklist service program.

3. The computer readable medium of claim 1, wherein the interface for accepting work items further comprises a pull interface configured to actively request work items from a workflow engine of at least one of the plurality of independent work item providers to be received by the worklist service program.

4. The computer readable medium of claim 3, wherein the pull interface is configured to request work items when the user activates the worklist service program.

5. The computer readable medium of claim 3, wherein the pull interface is configured to request work items according to a schedule.

6. The computer readable medium of claim 1, wherein the first legacy system differs from the work item provider for the given work item.

7. The computer readable medium of claim 1, wherein the first legacy system differs from the work item provider for the given work item, and wherein the custom attributes are retrieved for the given work item without support from the work item provider.

8. The computer readable medium of claim 1, wherein the custom attribute retriever is configured to retrieve the custom attributes in real time as work items are accepted over the interface for accepting work items.

9. The computer readable medium of claim 1, wherein the custom attribute retriever is configured to retrieve the custom attributes according to a schedule for work items that are accepted over the interface for accepting work items.

10. A computer implemented method comprising:
storing work items in a work item storage, wherein a work item is a task generated as part of a workflow process for handling by a user;

presenting work items via a graphical interface to the user from the work item storage and accepting input from the user relating to the work items;

accepting work items via an interface from one or more independent work item provider to be stored in the work item storage, wherein a work item provider comprises a workflow engine and one or more applications;

tracking, in an item type registry, handling for work items based on work item type; and retrieving, via a custom attribute retriever for a given work item of a given work item type and according to a staggered synchronization process, custom attributes for the given work item type that are in addition to attributes obtained with the given work item from its work item provider, wherein the custom attributes for the given work item are determined from the item type registry entry or entries for the given work item type, and wherein the custom attributes for the given work item are provided by a first legacy system and a second legacy system, wherein the staggered synchronization process operates during a start of a worklist client to reduce a delay of retrieving the custom attributes, and wherein the staggered synchronization process includes a first pull connector to the first legacy system having a first synchronization timing, and a second pull connector to the second legacy system having a second synchronization timing.

11. The method of claim 10, wherein the interface for accepting work items further comprises a push interface configured to allow work items to be pushed from a workflow engine of one or more of the independent work item providers to the worklist service program.

12. The method of claim 10, wherein the interface for accepting work items further comprises a pull interface configured to actively request work items from a workflow engine of one or more of the plurality of independent work item providers to be received by the worklist service program.

13. The method of claim 12, wherein the pull interface is configured to request work items when the user activates the worklist service program.

14. The method of claim 12, wherein the pull interface is configured to request work items according to a schedule.

15. The method of claim 10, further comprising:
logic to determine, for a first set of work item types, a work item type for an accepted work item based on type information provided by its work item provider; and
logic to determine, for a second set of work item types, a work item type for an accepted work item based on conditions specified within the worklist service program for the second set of work item types.

16. The method of claim 10, further comprising logic to respond to user actions, wherein the user actions are based on item type.

17. The method of claim 10, wherein the one or more independent work item provider is a single work item provider associated with an application and the worklist service program provides worklist handler functionality for the application.

18. The method of claim 10, wherein the attribute fields indicate display aspects for work items.

19. The method of claim 10, wherein the attribute fields indicate processing aspects for work items, wherein processing aspects for work items is information associated with the processing of the work items.

20. The computer readable medium of claim 1, wherein the work item type triggers an action related to the work item type.

* * * * *